(12) United States Patent
McInnis (10) Patent No.: US 10,570,604 B2
(45) Date of Patent: Feb. 25, 2020

(54) CURB INLET CATCH BASIN APPARATUS AND METHOD

(71) Applicant: Clean Way Services, Inc., Portland, OR (US)

(72) Inventor: Stephen McInnis, Portland, OR (US)

(73) Assignee: Clean Way Services, Inc., Portland, OR (US)

( * ) Notice: Subject to any disclaimer, the term of this patent is extended or adjusted under 35 U.S.C. 154(b) by 0 days.

(21) Appl. No.: 16/198,818

(22) Filed: Nov. 22, 2018

(65) Prior Publication Data

US 2019/0153719 A1 May 23, 2019

Related U.S. Application Data

(60) Provisional application No. 62/589,693, filed on Nov. 22, 2017.

(51) Int. Cl.
| | |
|---|---|
| *E03F 5/14* | (2006.01) |
| *E03F 5/04* | (2006.01) |
| *B01D 29/13* | (2006.01) |
| *B01D 29/64* | (2006.01) |
| *B01D 35/12* | (2006.01) |
| *C02F 1/00* | (2006.01) |
| *E03F 5/046* | (2006.01) |
| *C02F 103/00* | (2006.01) |

(52) U.S. Cl.
CPC .............. *E03F 5/14* (2013.01); *B01D 29/13* (2013.01); *B01D 29/6438* (2013.01); *B01D 35/12* (2013.01); *C02F 1/001* (2013.01); *E03F 5/0403* (2013.01); *E03F 5/0404* (2013.01); *E03F 5/046* (2013.01); *B01D 2201/082* (2013.01); *C02F 1/004* (2013.01); *C02F 2103/001* (2013.01); *C02F 2201/002* (2013.01); *C02F 2303/24* (2013.01)

(58) Field of Classification Search
CPC ....... E03F 5/0403; E03F 5/0404; E03F 5/046; E03F 5/14; B01D 35/12
USPC ..... 210/162, 163, 170.03, 747.3; 404/2, 4, 5
See application file for complete search history.

(56) References Cited

U.S. PATENT DOCUMENTS

| | | | |
|---|---|---|---|
| 2,615,526 A | * | 10/1952 | Lane ..................... E03F 5/0404 210/164 |
| 3,713,539 A | | 1/1973 | Thompson et al. |
| 3,815,748 A | | 6/1974 | Johannessen |
| 4,419,232 A | | 12/1983 | Amtyr et al. |
| 4,988,235 A | | 1/1991 | Hurley |
| 5,037,541 A | | 8/1991 | Ruey-Jang et al. |
| 5,133,619 A | | 7/1992 | Murfae et al. |

(Continued)

*Primary Examiner* — Christopher Upton
(74) *Attorney, Agent, or Firm* — Hancock Hughey LLP (57) ABSTRACT

A filtration apparatus for installation in a catch basin vault is described. A perforate support plate includes a retractable basket that lies below an opening in the support plate and is positioned below a manhole. Water flowing into the system flows onto the support plate and into the basket, which traps debris. The basket is slidable from an in-use position where the basket is positioned to screen debris flowing into the vault, and a cleanout-position in which the interior of the vault is accessible so that the vault may be cleaned. When the vault needs to be cleaned, the manhole cover is removed to allow workers to have access to the interior of the vault. The workers may clean out the basket, and then slide it out of the way so that they have access to the vault interior.

20 Claims, 4 Drawing Sheets

(56) References Cited

U.S. PATENT DOCUMENTS

| | | | |
|---|---|---|---|
| 5,223,154 A | 6/1993 | MacPherson, Jr. et al. | |
| 5,232,587 A * | 8/1993 | Hegemier | E03F 5/0404 |
| | | | 210/162 |
| 5,284,580 A | 2/1994 | Shyh | |
| 5,345,741 A | 9/1994 | Slater et al. | |
| 5,372,714 A | 12/1994 | Logue, Jr. | |
| 5,397,464 A * | 3/1995 | Hannon | E03F 5/0404 |
| | | | 210/163 |
| 5,403,474 A | 4/1995 | Emery | |
| 5,405,539 A | 4/1995 | Schneider | |
| 5,480,254 A | 1/1996 | Autry et al. | |
| 5,486,287 A | 1/1996 | Murphy et al. | |
| 5,529,436 A | 6/1996 | Meyers | |
| 5,575,925 A | 11/1996 | Logue, Jr. | |
| 5,643,445 A | 7/1997 | Billias et al. | |
| 5,849,181 A * | 12/1998 | Monteith | E03F 5/0401 |
| | | | 210/163 |
| 5,853,581 A | 12/1998 | Raybom | |
| 5,958,226 A | 9/1999 | Fleischmann | |
| 5,985,157 A | 11/1999 | Leckner et al. | |
| 6,080,307 A | 6/2000 | Morris et al. | |
| 6,086,758 A | 7/2000 | Schilling et al. | |
| 6,106,707 A | 8/2000 | Morris et al. | |
| 6,200,484 B1 | 3/2001 | McInnis | |
| 6,254,770 B1 | 7/2001 | Remon | |
| 6,537,446 B1 | 3/2003 | Sanguinetti | |
| 6,797,162 B2 * | 9/2004 | Happel | E03F 5/0404 |
| | | | 210/163 |
| 6,884,343 B2 | 4/2005 | Harris et al. | |
| 7,524,414 B1 | 4/2009 | Barragan | |
| 7,658,857 B2 | 2/2010 | Wacome | |
| 7,670,483 B2 | 3/2010 | Ringenbach | |
| 8,088,279 B2 | 1/2012 | McInnis et al. | |
| 8,221,632 B2 | 7/2012 | McInnis et al. | |
| 8,343,357 B2 | 1/2013 | Horner | |
| 8,608,956 B2 | 12/2013 | Moulton et al. | |
| 9,296,021 B2 | 3/2016 | Moulton | |
| 9,322,156 B2 | 4/2016 | McInnis et al. | |
| 2001/0030150 A1 | 10/2001 | Remon | |
| 2003/0136717 A1 * | 7/2003 | Tseng | E03F 5/0404 |
| | | | 210/163 |
| 2005/0051499 A1 | 3/2005 | Nino | |
| 2005/0183997 A1 | 8/2005 | Happel et al. | |
| 2011/0155672 A1 | 6/2011 | McInnis | |
| 2011/0303623 A1 | 12/2011 | Caldwell | |
| 2013/0008851 A1 * | 1/2013 | Jarvis, Jr. | E03F 5/0404 |
| | | | 210/499 |
| 2017/0284077 A1 * | 10/2017 | Deurloo | E03F 5/0404 |

* cited by examiner

CURB INLET CATCH BASIN APPARATUS AND METHOD

TECHNICAL FIELD

The present invention relates to a filtration apparatus for surface water, and more specifically to a filtration apparatus for removing sediment and other debris and contaminants from surface water and adapted for use with existing curb inlet catch basins.

BACKGROUND OF THE INVENTION

Surface water run-off is coming under increased scrutiny as a source of pollutants entering ground water, streams and rivers. As water from rain or snow melt and other sources flows over the surface of the ground it picks up a wide variety of pollutants, ranging from large and small debris, suspended solids and sediment to oils and other soluble and insoluble chemical contaminants. Because surface water is relatively easily contained through storm sewers and dry wells, many agencies at all levels of the government are paying increased attention to both the contaminants that enter the water system through surface water run-off, and to methods to control and eliminate such contaminants. Moreover, governmental regulations currently in place put restrictions on the amount of sediment that can be permitted to flow into sewer systems.

A municipal storm sewer system is one type of traditional surface water filtering system. In this type of system a series of catch basins or collection boxes are interconnected with sewer pipe. Surface water flows into the catch basin, often a relatively narrow un-grated inlet opening—the opening is often 4 inches or less in height. The water that flows into the opening enters the catch basin, which is a collection box or vault that functions essentially as a settling basin. Such collection boxes are sometimes called sump tanks. Some sediment that flows into the system settles to the bottom of the basin, and the water flows through an outlet pipe and into the sewer system and, depending upon the system, either to another processing facility or directly into a stream or river.

This traditional system is useful as a primary control system, and is relatively inexpensive, but it has many problems. As examples of the problems, the catch basin can quickly be filled with sediment if the water contains a high level of solids or sediment, causing the catch basin to become filled and the system to overflow or become clogged. Because the catch basin is typically a cylindrical tube or a rectangular box that sits below grade level, cleaning the sediment out of the basin can be a difficult job. Cleaning is made much more difficult if the system is clogged and the basin is underwater. Just as important, the system does not stop all of the sediment and other pollutants in the run-off. Typically, the water flow through the basin is fairly turbulent, especially when there is a lot of water flowing through the system, for instance during a storm. When this occurs very little sediment settles out, and is instead washed through the basin and into the sewer system. This may result in non-compliance with governmental regulations, possibly resulting in fines. Finally, a typical catch basin system does nothing to collect oils and other chemical contaminants and dissolved solids.

The grated catch basin type of system is routinely used with both private and municipal systems. In a dry well the surface water that flows through the sump tanks flows into a dry well associated with one or more basins rather than flowing into a municipal or other sewer system. However, to function properly, dry wells must have sufficient flow-through characteristics. Water containing a high level of sediment can quickly clog a dry well by stopping water flow-through. And as noted above, a grated catch basin does not stop oils and other chemicals. These kinds of pollutants, and especially oils that flow through the system can clog dry wells very quickly. Commercial dry wells can be very large, especially if they are used to contain run-off from a large area such as a large private parking lot, and are connected to numerous catch basins. It is typically very expensive to dig a new dry well, or to unclog an existing well.

As noted, many government agencies are paying increased attention to contaminants that are carried into streams and rivers in surface water run-off. Because polluted surface water run-off can be a significant source of pollution, agencies have begun to monitor the levels of contaminants in run-off, both in municipal and private systems. In the past several years, many municipalities have begun to impose fees on catch basin users, whether the catch basin is connected to a storm sewer system or a dry well. While these fees apply in most instances to commercial users, they can also apply to residential systems. In large part the fees are based in some manner on the kind and amount of pollutants that flow through the catch basin and into the system. In general, the higher the level of contaminants flowing through the system, the higher the fee. In some cases the amount of the fee is based on the kind of contaminant. For example, oils flowing into a sewer or dry well can lead to increased fees. These fees even apply to private commercial dry well users, since it is in the interest of a municipality to control the amount of pollution that enters the ground water.

There is therefore a strong incentive to decreasing both the amount and kind of contaminants flowing through a catch basin and into either a municipal sewer system or a private dry well or sewer system. First, there is an obvious environmental incentive: by decreasing contamination of all kinds from surface water run-off, the water that flows back into the ground and into streams and rivers is cleaner. This helps to improve environmental conditions in numerous ways. Second, there is a strong economic incentive: when sewer system and dry well users are paying fees based on the amount and kind of contaminants that flow into their systems, it is of obvious advantage to minimize all contaminants. Further, the costs associated with either cleaning catch basins or reconditioning dry wells are substantial. Avoiding or delaying those costs by reducing the amount of contaminants flowing through the system can save substantial amounts of money.

Curb-inlet catch basins are ubiquitous and are one type of vault used in storm sewer systems and functions the same as the systems described above. However, a curb-inlet catch basin is located along side roadways, typically those that are either paved with asphalt or which are concrete. Water flows off the roadway and enters the catch basin through an opening formed in a roadside curb. While there are numerous different designs for curb-inlet systems, a typical system has a below-grade vault made of reinforced concrete and which is connected to the sewer system through pipes. The vault is generally a square or rectangular box, the upper edge of which is typically at or near the same elevation as the roadway. A square riser or lid that is the same size as the vault and which also is typically concrete sits atop the vault. The riser is typically the height of the curb. A top unit typically sits atop the riser and defines a plate that rests on the riser and covers the vault. The top unit has a removable manhole cover, almost always round, which allows access to the vault for maintenance. Often, the lid is a one piece unit that covers the vault and has a manhole that provides access to the interior of the vault.

Curb-inlet systems present the same problems as the other systems described above and it is therefore desirable to filter water that flows into the systems. However, curb-inlet systems present unique challenges since the manhole access covers are typically round and the vaults beneath the covers are typically square and because the lid that covers the vault typically cannot be removed once it is in place, at least not without a significant amount of work involving equipment able to lift very heavy concrete structures (i.e., the lid). And in cases where the manhole access cover is other than round, the access plate to the underlying structures is typically smaller in size than the vault below the access plate. It is very difficult therefore to retrofit a filter system that easily fits through the round manhole cover and securely attaches to the vault. As a result, installation of conventional filtering systems is made very difficult; often the entire top unit has to be removed and a significant amount of labor is required to install the filter system.

There is a need therefore for a filter system that may be easily installed in existing curb-inlet catch basins and which functions to allow simple removal of debris.

SUMMARY OF THE INVENTION

The present invention is designed to be installed in existing curb-inlet catch basins that are in turn attached to existing municipal separate storm sewers and dry well systems and other storm water treatment systems, such as swales and infiltration ponds.

The system of the present invention comprises a perforate support plate that includes a retractable and perforate basket suspended below the support plate. The basket lies below an opening in the support plate and is preferably positioned such that it lies directly below the manhole cover.

Run-off flowing into the system preferably must pass through a flow path defined by the support plate and into the basket as described herein. The inlet into the catch basin through the curb is a traditional inlet opening, which as noted is typically quite narrow in the height dimension, often 4 inches or less. Water flows onto the support plate and is directed into the basket, which is defined by a perforate screen that has an open upper end and a perforate screen on the lower end; this filter traps debris that flow into the inlet opening. The screen is rigid or semi-rigid. The apparatus does not contemplate any secondary or tertiary filtration of, for example, dissolved solids or specific chemical components in the water; only solid debris is filters.

The basket is slidable from an in-use position where the basket is positioned to screen debris flowing into the vault, and a cleanout-position in which the interior of the vault is accessible so that the vault may be cleaned. Thus, when the vault needs to be cleaned, the manhole cover is removed to allow workers to have access to the interior of the vault. The workers may clean out the basket, and then slide it out of the way so that they have access to the vault interior. A Vactor truck or similar unit is typically used to clean the filtration apparatus and the vault. It will be appreciated that if the basket is slid out of the way, the workers will also have access to the interior of the vault through the opening in which the support plate, even without retracting the support plate.

BRIEF DESCRIPTION OF THE DRAWINGS

Further features and advantages of the present invention will become apparent from the following detailed description, taken in combination with the appended photographs and drawings, in which:

FIG. 2 is a top plan view of a filtration apparatus according to the invention installed in a vault with the vault lid removed to expose and illustrate the apparatus; in FIG. 2 the slidable basket is in the closed position.

FIG. 3 is a top plan view of a filtration apparatus according to the invention installed in a vault with the vault lid removed to expose and illustrate the apparatus, the view of FIG. 3 taken along the line 3-3 of FIG. 5; in FIG. 3 the slidable basket is in the open or "clean out" position.

DETAILED DESCRIPTION OF PREFERRED AND ILLUSTRATED EMBODIMENTS

The invention will now be described in detail with reference to the drawings. It will be understood that relative directional terms are used at times to describe components of the invention and relative positions of the components. As a naming convention, the plane of the ground, for example, in FIG. 1, the surface of the road and/or the surface of the vault cover is considered for purposes herein to be a generally horizontal surface (although in working conditions the surface could be sloped). Directional terms correspond to this assumedly horizontal plane: "upper" refers to the direction above and away from the road surface; "lower" is generally in the opposite direction, "inward" is the direction from the exterior of the vault in which the invention is installed toward the interior of the vault, "vertical" is the direction normal to the plane of the road surface, and so on.

Figure 1:
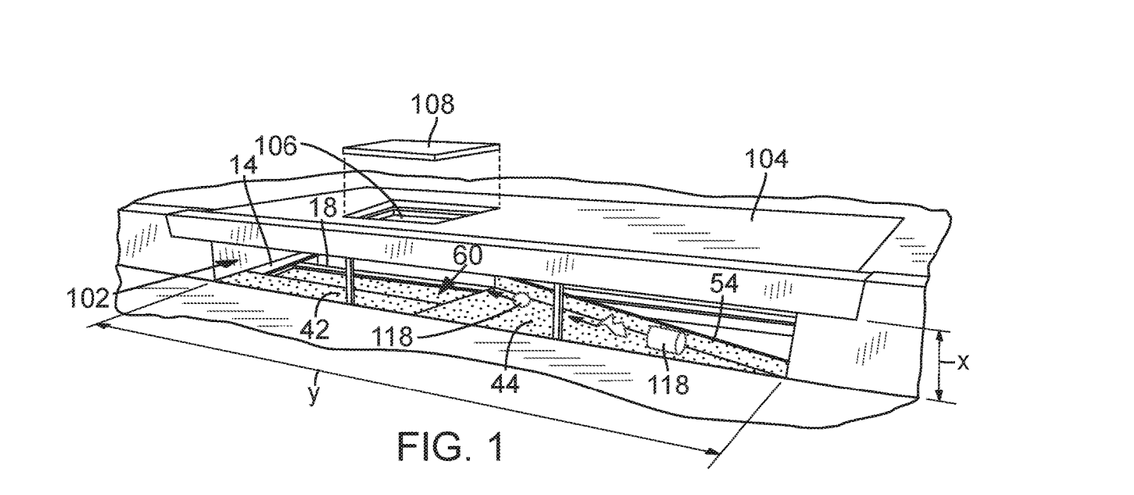
FIG. 1 is a perspective of a curb inlet into a vault of the type that a filtration apparatus according to the present invention has been installed.

With continuing reference to FIG. 1, the figure illustrates the general environment in which the filtration apparatus 10 of the invention is typically used, and more specifically, a curb-inlet vault 100. The vault is an existing in-ground structure. For context, filtration apparatus 10 of the present invention is adapted for installation in existing curb-side sewer vaults. A curb-side sewer vault is installed at the side of a roadway at an elevation such that water running off a road surface flows from the road surface into an inlet opening 102 into the pre-existing vault that defines a basin that is located below the grade of the road surface. There are numerous kinds of catch basins that are used for vaults. Most typically, the vault is a square or rectangular box-like structure made of precast concrete and having a top capped with a very heavy lid 104, the top surface of which typically often defines a portion of the sidewalk and which has a manhole opening 106 that is closed with a removable manhole cover such as removable cover 108. The manhole provides an opening through the sidewalk into the interior of vault and as noted, a removable manhole cover closes manhole. Most manholes are square (such as that shown) or round, and most manhole covers are therefore accordingly shaped, either square or round. However, manhole covers may be found in many different configurations. In the case of a round manhole, the access dimension into the interior of the underlying vault is defined as the diameter of the round opening. Where the manhole is some other shape, for instance square or rectangular, the access dimension is the length of the longest diagonal between corners of the opening.

Figure 5:
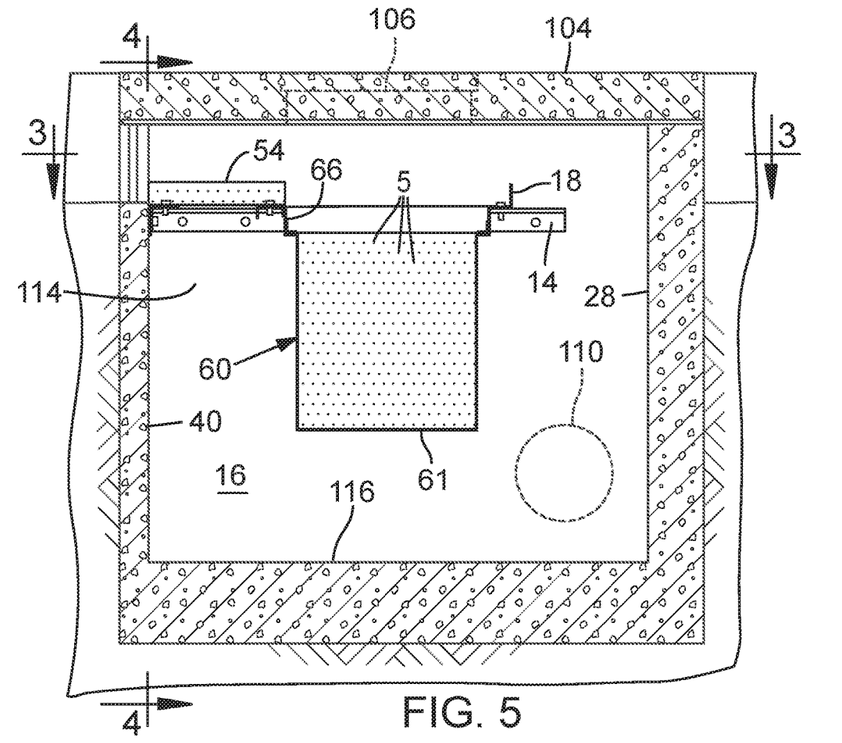
FIG. 5 is a cross sectional elevation view of the vault and filtration apparatus shown in FIG. 2, taken along the line 5-5 of FIG. 4.

The vault 100 has an open interior and an outlet 110, FIG. 5, that is connected to the storm sewer system. As detailed below, a typical vault 100 has front wall 40, that is, a vertical wall nearest the inlet 102 and an opposite vertical rear wall 28. The vault has opposed side walls 16 and a floor 116. Water flowing from the roadway enters vault through an inlet 112 and flows into the open interior 114 (FIG. 5) and exits through outlet 110 into the storm sewer system. The outlet 110 is positioned above the floor 116 of the vault so the vault acts as a settling basin where solids may settle out and collect while water flows through outlet. The vault is cleaned by accessing open interior through the manhole 106 and using conventional manual or machine cleaning techniques such as a Vactor truck.

The inlet 112 into the vault is typically a fairly restricted opening—a dimension of 4 inches in height by 48 inches in width is typical although there is no "standard" inlet opening dimension and there are a wide variety of inlet opening dimensions used. In any case, for purposes herein, the height dimension of the un-grated inlet opening is defined as X and the width dimension is Y, as shown in FIG. 1. It will be appreciated that the size of the inlet allows all kinds of debris to be washed from the road surface into the vault.

Many municipalities have adopted rules and regulations relating to the size of particulate matter—"debris"—that can enter the storm sewer system through in-ground vaults such as those described and shown herein. While the regulations vary from municipality to municipality, one typical standard is 5 mm. Thus, regulations in many local municipalities specify that debris greater in size than 5 mm must be kept out of the storm sewer.

Figure 6:
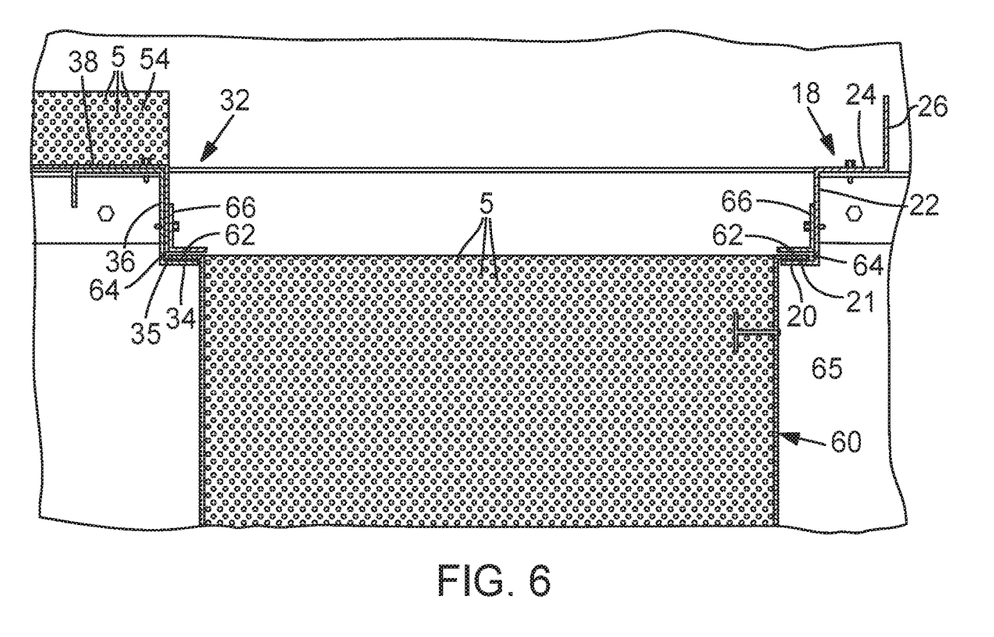
FIG. 6 is a fragmentary side view of the basket and base plate used in the filtration apparatus according to the invention.

Referring now to the drawings, the filtration apparatus 10 according to the present invention is defined by a base plate 12 that is retained in the interior of the vault at about the same elevation as the roadway so that water flowing into the vault through the curb inlet flows directly and only onto the base plate. The base plate 12 is retained in the vault with appropriate fasteners 14 such as jack screws, angle iron supports and the like that are attached to the interior walls 16 of the vault around its perimeter in order to support apparatus 10 at the desired position. As best seen in FIG. 6, the base plate 12 is supported on a support frame that is defined by a rear support member 18 and a front support member 32. Rear support member 18 extends between the opposite walls 16 and which has (a) an inwardly projecting lip 20 that defines a shelf 21, (b) an upwardly projecting portion 22 that meets (c) an outwardly projecting shelf 24, and (d) an upwardly projecting edge 26 that extends across the rear side of the base plate (i.e., opposite the inlet 112). The rear support member 18 and base plate 12 are spaced apart from the rear wall 28 of vault 100 to define a space 30 between the base plate 12 and the rear of the vault. As detailed below, the space 30 defines an overflow path for water that flows over the upwardly project edge 26 of base plate 12 when the volume of water flowing into the vault is greater than the amount that can flow through the filtration apparatus 10.

Base plate 12 further is supported in the vault with a forward support member 32 that is configured similarly to rearward support member 18 and extends between walls 16, and which includes (a) an inwardly projecting lip 34 that defines a shelf 35, (b) an upwardly projecting portion 36 that meets (c) an forwardly projecting section 38. Forward support member 32 and rear support member 18 define together a mounting frame for supporting the base plate 12 and a basket 60, as detailed below.

The opposite, outer ends of rearward support member 18 and forward support member 32 are fixed to the walls 16 in an appropriate manner, and as shown herein, with angle irons 14. Forward support member 32 is spaced apart from the front wall 40 of vault 100.

Figure 2:
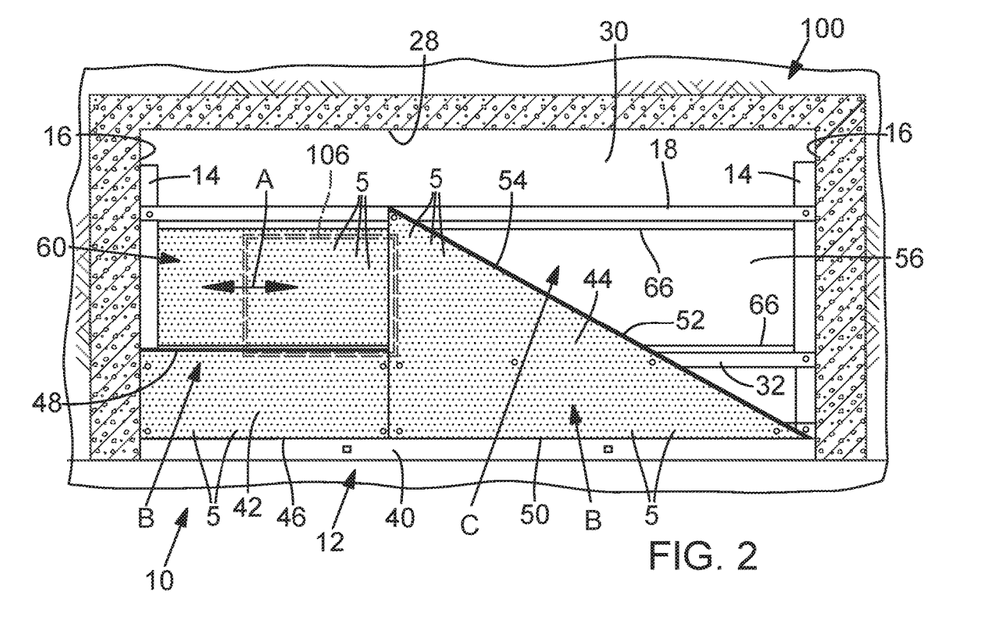

The base plate 12 is defined by two portions, a first rectangular portion 42 and an adjacent second triangular portion 44, as best seen in FIG. 2, and both of which are fabricated of a mesh material that has plural openings, perforations 5 in the drawings, and which are sized according to the particular installation and which function to allow water to flow through the base plate and to screen out particulate debris. The base plate 12 is sized so that it extends completely across the opening into the vault defined by inlet 102. Thus, a width dimension Y shown in FIG. 1 is the width of the inlet 102 and the width dimension of base plate 12 is preferably either the same as or greater than the width Y of inlet 102. As noted above, some municipalities specify that debris that is 5 mm or greater in size must be screened out of the sewer system. Accordingly, in the embodiment illustrated herein the openings in the mesh material are approximately 4.7 mm in diameter (round) to comply with a municipal code that specifies screening of all debris greater than 5 mm. Of course, the size of the openings may vary depending upon requirements at the location of installation. A range of sizes of the perforations is thus in one embodiment from about 0.5 mm to about 5 mm and preferably no greater than 5 mm in any dimension. The preferred percentage of openings in the material used to fabricate the base plate and basket is about 51% of the total area.

The front edge 46 of rectangular portion 42 of base plate 12 runs along the front wall 40 of vault 100 and the rear edge 48 is joined to forwardly projecting section 38 of forward support member 32. The triangular portion 44 has a front edge 50 that extends along front wall 40 and a rear edge 52 that extends angularly from the intersection of front wall 40 and side wall 16 toward rearward support member 18 and is joined thereto. The combination of the rectangular portion 42 and the triangular portion 44 thus define a perforate base plate that extends entirely across inlet 102 (i.e., width dimension Y in FIG. 1) and adjacent to the front wall 40 so that water flowing from the road into the vault flows onto the base plate 12. An upwardly projecting lip 54 is formed along the angularly extending rear edge 52 of triangular portion 44 and the lip is preferably formed of the same mesh material as the rectangular and triangular portions 42 and 44 of base plate 12. A triangularly-shaped opening 56 into vault 100 is defined by the angular shape of the triangular portion 44 as best seen in FIG. 2.

A rectangular opening 58 is formed in the base plate 12 at a location that is directly below the manhole opening 102 into the vault 100 through the vault lid 104 and between front support member 32 and rear support member 18. A basket 60 is suspended below the base plate 12 as described below and is slidable relative to the base plate from a first position in which the basket is coincident and registers with the rectangular opening, and a second position in which the basket has been slid to a position in which the basket is at least partially or wholly moved away from the rectangular opening. The lower edge 61 of basket 60 is suspended above the floor 116 of vault 100 and the basket may optionally include handles such as handle 65 shown in FIGS. 5 and 7.

Looking at FIG. 6, basket 60 is slidably suspended beneath base plate 12 by virtue of front and rear upper, outwardly extending edges 62 that are received in a slot 64 that is defined between the rear and forward support members 18 and 32. Specifically, an angle iron 66 is bolted or otherwise attached to rear support member 18 in a position to form the slot 64 between the angle iron and the inward lip 20 of the support member. An angle iron 66 is similarly bolted or otherwise attached to forward support member 32 in a position to form the slot 64 between the angle iron and the inward lip 34. The outward extending edges 62 of basket 60 are received in the slots 64 thus formed so that the basket is slidable in the slots.

Basket 60 is preferably fabricated of the same mesh material as described above with respect to base plate 12, namely, mesh material that has openings that are sized according to the particular installation and which function to screen out particulate debris. In the embodiment illustrated herein the openings in the mesh material that is used for basket 60 are approximately 4.7 mm in diameter (round) to comply with a municipal code that specifies screening of all debris greater than 5 mm, and of course, the size of the openings may vary depending upon requirements at the location of installation.

Figure 3:
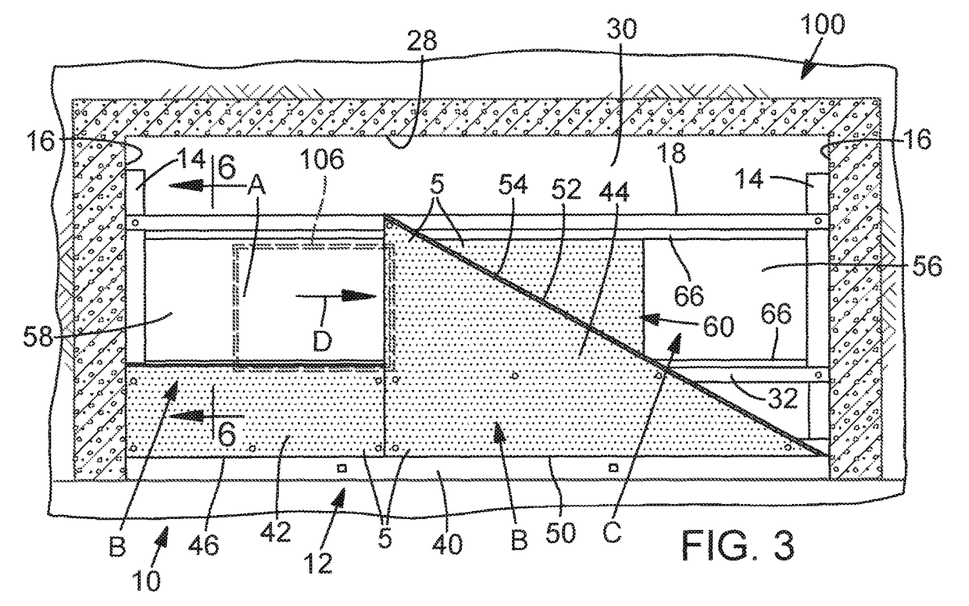
Figure 4:
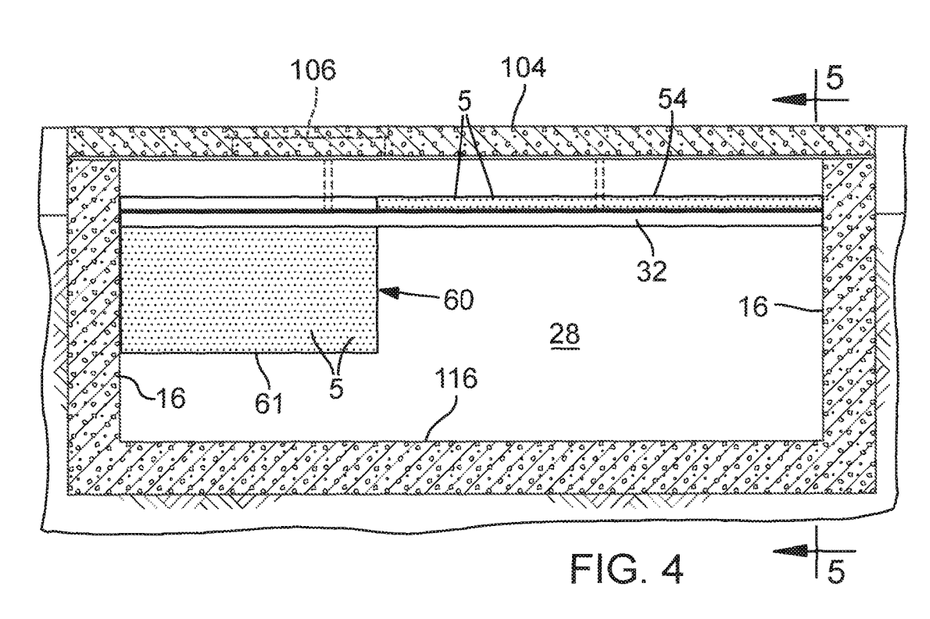
FIG. 4 is a cross sectional elevation view of the vault and filtration apparatus shown in FIG. 2 and taken along the line 4-4 of FIG. 5.

Returning to FIG. 1, the double-ended arrow A illustrates the manner in which the basket 60 may be slid relative to the base plate 12. In FIG. 1 the basket 60 is in a closed position such that the basket 60 is coincident and registers with the rectangular opening 58. Stated another way, when basket 60 is in the closed position of FIG. 1 the basket underlies and is completely below the periphery of rectangular opening 58. As indicated by the arrow A, the basket 60 may be slid relative to the base plate 12. When the basket is slid from the closed position shown in FIG. 1 to an open position as shown in FIG. 3 with arrow D—to the right in the view of FIG. 3, the basket has been moved such that the rectangular opening 58 defines an opening into the vault 100 interior. In FIG. 3, in which the basket 60 has been slid to the side so that the basket has left the rectangular opening 58 at least partially open the interior of the vault is accessible through the rectangular opening. That is, with the basket in the clean out position of FIG. 3, the rectangular opening 58 at least partially underlies the manhole 106 so that the manhole opening and the rectangular opening are at least partially registered with one another. It will be appreciated that the slidable interconnection between the base plate 12 and the basket 60 described above both suspends the basket below the base plate and allows the basket to be slid to a position in which the rectangular opening 58 is either partially or completely open to the interior of the vault. In this open position, a work crew is able to access the vault interior through manhole opening 102 for either directly entering the vault, or to insert suction hoses and the like for cleaning the vault.

As detailed above, the base plate 12, the upwardly projecting lip 54 at the rear edge of the triangular portion 44 of the base plate, and the basket 60 are fabricated of a mesh material and the preferred percentage of openings in the material used to fabricate the base plate and basket is about 51% of the total area.

The filtration apparatus 10 according to the present invention is installed in a vault 100 by removal of the vault lid 104 and then suspending the apparatus 10 in the vault interior with the base plate and approximately the elevation of the road surface and with the front edge of the base plate abutting the interior front interior edge of the vault. In this position the base or lowermost part of the basket 60 is suspended in the vault above the base or floor 116 of the vault. While the basket is slidable relative to the base plate as detailed above, the basket cannot be removed from the base plate.

Once the filtration apparatus 10 has been installed in the vault 100, water and debris that flows into the vault through the inlet 110 will initially flow onto the perforate base plate 12. Water flow directly through the perforations in the base plate into the underlying vault and some debris such as large particulate matter (e.g., 118, FIG. 1) will be retained on the base plate 12 because the size is larger than the diameter of the perforate openings in the base plate. Debris and particulates that are smaller than the perforate openings flows through the perforations into the vault. However, debris and particulate matter is too large to move through the perforations in the base plate is channeled either directly into the basket 60, or along the angularly extending lip 54 and then into the basket. Debris that flows into the basket will be retained in the basket while water flows into the vault interior through the basket and into the storm sewer system. The primary flow path of water and debris into the vault is referred to as flow path B and is shown with arrows B in FIG. 2. Flow path B comprises water flowing through plural perforations in base plate 12, through plural perforations in basket 60.

In some circumstances the volume of water flow into the vault through the curb inlet may be greater than can flow through the perforate openings in the base plate and basket. This may occur, for instance, during storms when the volume of water runoff is significant, or when the basket and/or the base plate 12 is relatively full of debris and the perforations in the base plate are at least partially clogged. In these situations, an excess water flow path is defined from the roadway through the curb inlet, and then over the base plate and over the upwardly projecting lip 54 and directly into triangularly shaped opening 56 into the vault. This overflow flow path—arrow C in FIG. 2—prevents water backup in high flow situations. While the water flowing through the overflow path is not filtered, it prevents backup that could be more dangerous that a temporary unfiltered situation.

Cleaning the filtration apparatus 10 and the vault 100 is made simple by virtue of the sliding basket 60. Specifically, when maintenance is required the cover 108 is removed from the vault lid 104. The basket 60 is normally in the position shown in FIG. 2, and will contain debris that has not flowed through the base plate or the basket into the vault 100. The debris that is retained in the basket and on the base plate may be removed by the worker, either manually or preferably with a suction hose. Next, the basket is slid to the open position shown in FIG. 3 to expose the vault interior. The maintenance crew may then clean out the vault interior with a suction hose or otherwise to remove accumulated particulate matter. The vault may also be directly accessed by workers since the rectangular opening 58 underlies the manhole 106 and the worker may enter the vault through the manhole and the opening 58.

The apparatus shown in the drawing figures may be sized according to the particular installation. For instance, the apparatus may be designed primarily for a residential type of installation (for example, a vault that is installed in a typical residential area), or for or a commercial type of installation where the vault has a larger capacity and larger dimensions than the residential unit and where the apparatus 10 would accordingly be larger.

Figure 7:
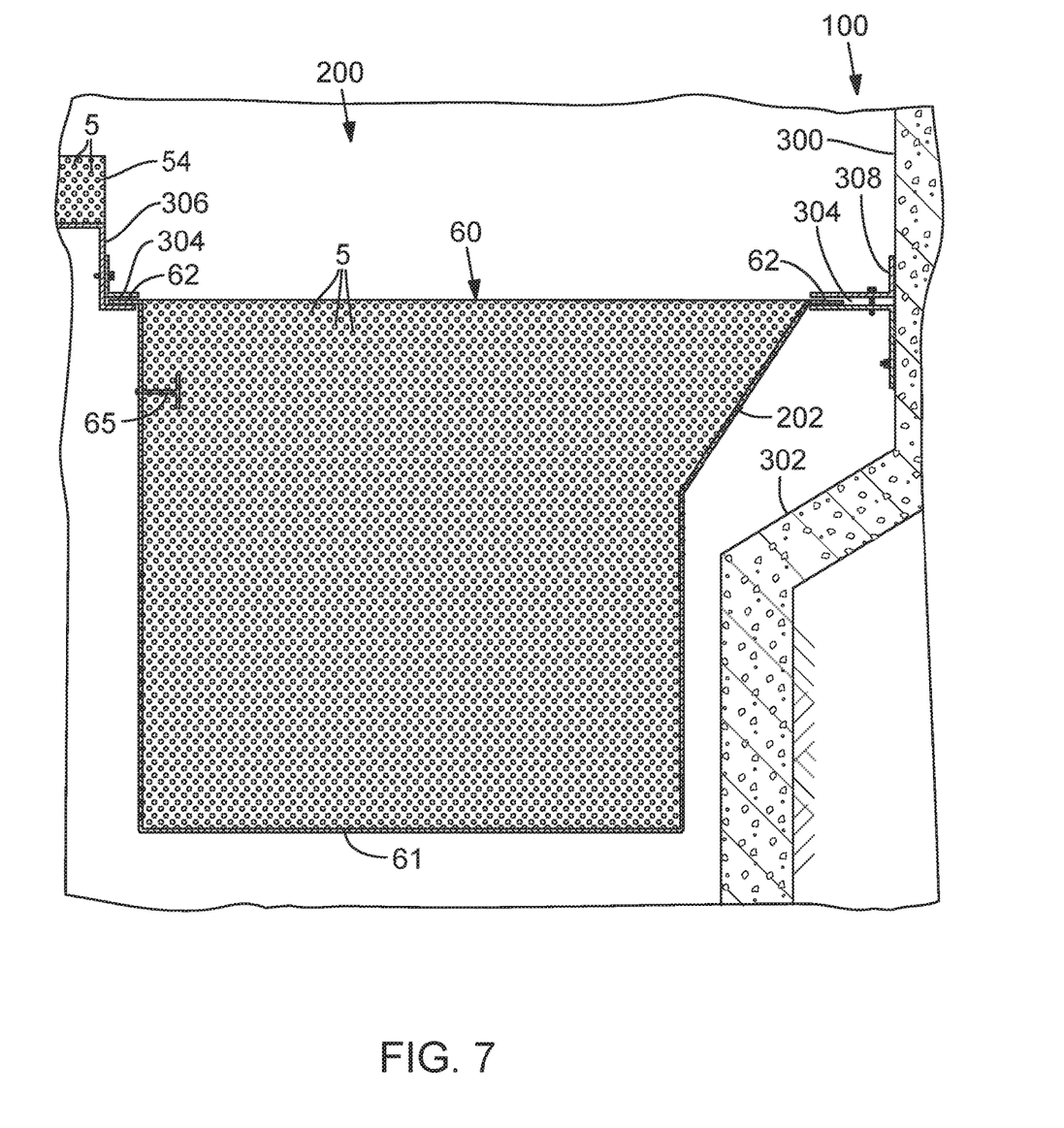
FIG. 7 is a side view of an alternative embodiment of a basket and base plate according to the invention.

Turning now to FIG. 7, the principals of the invention described above may be embodied in alternative structural configurations in order to be adapted for vaults that have different interior configurations. The vault 100 shown in FIG. 7 has a rear wall 300 that has a stepped, angled portion at 302. The filtration apparatus 200 in this embodiment is configured for installation in a vault 300 and thus, in the cross sectional view of FIG. 7 the basket 60 includes a stepped, angled portion at 202 that allows the basket to be slidably retained in the vault as described above between closed and clean out positions. In the embodiment of FIG. 7, the outwardly extending edges 62 of basket 60 are retained in slots 304 that are defined in front and rear brackets 306 and 308—bracket 308 is attached directly to the rear wall 302. The basket 60 shown in FIG. 7 is operable in the same manner as described above with respect to the embodiment of FIGS. 1 through 6, namely, the basket in the normal operating position underlies and registers (at least partially) with the manhole opening through the vault lid and is slidable to the clean out position in which maintenance workers are able to access the vault interior.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A filtration apparatus for use with an in-ground vault having an inlet, a vault interior having interior walls including a front wall nearest the inlet, a rear wall opposite the front wall, opposite side walls and a floor, and the in-ground vault including a lid with a manhole, comprising:
   a perforate base plate retained in the vault interior, the base plate having a forward edge extending across the inlet and a rearward edge spaced apart from the rear wall;
   a perforate basket movable relative to the base plate between a first position in which the basket at least partially underlies the manhole and a second position in which an opening through the base plate underlies the manhole.

2. The filtration apparatus according to claim 1 wherein when the perforate basket is in the first position a primary flow path of water into the vault is defined across the base plate and into the basket.

3. The filtration apparatus according to claim 2 wherein when the perforate basket is in the second position the opening through the base plate defines an access path from the manhole to the vault interior beneath the base plate.

4. The filtration apparatus according to claim 1 including a mounting frame for supporting the perforate base plate, the mounting frame including a front support member having opposite ends attached to the opposite side walls of the vault, and a rear support member spaced apart from the front support member and having opposite ends attached to the opposite side walls of the vault, and wherein the basket is suspended between the front and rear support members.

5. The filtration apparatus according to claim 4 in which the base plate further comprises a section that extends angularly from one of the side walls to the rear support member and is attached to the rear support member at a point intermediate between the opposite ends of the rear support member.

6. The filtration apparatus according to claim 5 in which the section of the base plate that extends angularly includes an upwardly projecting lip.

7. The filtration apparatus according to claim 6 in which the upwardly projecting lip is perforated.

8. The filtration apparatus according to claim 4 wherein each of front support member defines a first elongate shelf and the rear support member defines a second elongate shelf, and the basket has a first outwardly projecting edge and a second outwardly projecting wherein the basket is supported with the first outwardly projecting edge on the first elongate shelf and the second outwardly projecting edge on the second elongate shelf.

9. The filtration apparatus according to claim 8 in which the first and second elongate shelves further defines an first and second elongate slots and the first and second outwardly projecting edges are in the first and second respective elongate slots.

10. The filtration apparatus according to claim 1 in which the perforate base and perforate basket are defined by plural perforations that are no greater than about 5 mm in any dimension.

11. A method of filtering debris from runoff water that enters an in-ground vault through a vault inlet, the vault having an interior having a front wall nearest the inlet, a rear wall opposite the front wall, opposite side walls and a floor, and the a lid with a manhole, comprising the steps of:
   a) installing a support frame in the vault;
   b) installing on the support frame a base plate fabricated from a perforated material, the support frame having an opening in at least partial registration with the manhole;
   c) suspending a basket from the support frame so that the basket is movable between a first position in which the basket aligns with the opening in the support frame and a second position in which the basket is at least partially spaced from the opening, the basket fabricated from a perforated material.

12. The method according to claim 11 including the step of fabricating the base plate and the basket with a material having perforations that are no greater than 5 mm in any dimension.

13. The method according to claim 12 including the step of cleaning the vault by
   a) with the basket in the first position, removing debris retained in the basket; and
   b) moving the basket in the second position;
   c) with the basket in the second position, removing debris from the vault beneath the base plate.

14. The method according to claim 13 in which the debris is removed with a suction hose.

15. The method according to claim 14 in which the suction hose is inserted through the manhole.

16. The method according to claim 12 wherein the base plate and the basket define a first fluid flow path in which run off water flows into the vault through the perforations in the base plate and the perforations in the basket and in which debris is retained on the base plate and in the basket.

17. The method according to claim 16 wherein an overflow flow path for run off water is defined from the inlet, over the base plate and into the vault interior without including the basket.

18. A filtration apparatus for use with an in-ground vault having an inlet, a vault interior having interior walls including a front wall nearest the inlet, a rear wall opposite the front wall, opposite side walls and a floor, and the in-ground vault including a lid with a manhole, comprising:

a support frame defined by first and second support members, each support member having first and second opposite ends connected to the opposite side walls of the vault interior so that the support members are spaced apart from one another;

a perforate base plate supported in the vault interior on the first and second support members, the base plate having a forward edge extending across the inlet and a rearward edge spaced apart from the rear wall, the base plate further defining an opening;

a perforate basket suspended from the support frame and movable relative to the base plate between a first position in which the basket at least partially underlies the manhole and the opening in the base plate a second position in which an opening in the base plate is exposed.

19. The filtration apparatus according to claim 18 in which the opening in the base plate at least partially underlies and registers with the manhole.

20. The filtration apparatus according to claim 19 in which each support member comprises and elongate bar having a shelf projecting inwardly toward the other support member, and wherein the basket comprises a first outwardly projecting edge and a second outwardly projecting and the basket is suspended on the support members with the first outwardly projecting edge on the shelf of one of the support members and the second outwardly projecting edge on the shelf of the other support member and wherein each support member further comprises an elongate angle iron attached to the support member to define a slot between the angle iron and the shelf, and wherein the outwardly projecting edges of the basket are slidably received in the slots on the support members.

* * * * *